United States Patent [19]
Larson

[11] Patent Number: 5,418,584
[45] Date of Patent: May 23, 1995

[54] RETROREFLECTIVE ARRAY VIRTUAL IMAGE PROJECTION SCREEN

[75] Inventor: Brent D. Larson, Cave Creek, Ariz.

[73] Assignee: Honeywell Inc., Minneapolis, Minn.

[21] Appl. No.: 999,258

[22] Filed: Dec. 31, 1992

[51] Int. Cl.6 .............................. G03B 21/28
[52] U.S. Cl. ..................... 353/122; 353/38; 359/459; 359/629; 359/634
[58] Field of Search ............ 353/38, 81, 82, 98, 353/99, 122, 29; 359/454, 455, 458, 459, 529, 530, 546, 572, 629, 630, 631, 633, 634

[56] References Cited

U.S. PATENT DOCUMENTS

| | | | |
|---|---|---|---|
| 2,482,115 | 9/1949 | Laird, Jr. | 353/99 |
| 3,200,702 | 8/1992 | Giordano . | |
| 3,620,592 | 11/1971 | Freeman | 353/99 |
| 4,340,274 | 7/1982 | Spooner | 359/455 |
| 4,348,185 | 9/1982 | Breglia et al. . | |
| 4,509,837 | 4/1985 | Kassies . | |
| 4,864,222 | 9/1989 | Aoshima et al. | 324/96 |
| 5,035,474 | 7/1991 | Moss et al. . | |
| 5,189,452 | 2/1993 | Hodson et al. | 353/122 |

OTHER PUBLICATIONS

IBM-Technical Disclosure Bulletin, N. M. Leon; Jun. 1979, vol. 22 No. 1, p. 365
"Retroreflecting Sheet Polarizer," by M. Weber, on pp. 427-429 in Society for Information Display International Symposium, Digest of Technical Articles, vol. XXIII, May 17-22, 1992, Hynes Convention Center, Boston, Mass.

Primary Examiner—William A. Cuchlinski, Jr.
Assistant Examiner—William C. Dowling
Attorney, Agent, or Firm—John G. Shudy, Jr.

[57] ABSTRACT

A retroreflective array projection screen for displaying virtual images wherein the apparent distances from the observer to the viewed subject is greater than the distance from the observer to the retroreflective screen. Real images from a source are collimated and then partially reflected onto the retroreflective array. Virtual images are reflected from the array through the beamsplitter onto an observer at an exit pupil.

26 Claims, 9 Drawing Sheets

RETROREFLECTIVE ARRAY VIRTUAL IMAGE PROJECTION SCREEN

BACKGROUND OF THE INVENTION

The present invention pertains to virtual image display systems, where the displayed imagery appears to be located beyond the physical dimensions of the display system. Particularly, the invention pertains to virtual image display systems having compact collimation and relay optics, high resolution, wide field of view, full color mono- or stereoscopic capabilities, and a large exit pupil.

There are a wide variety of techniques for optical displays. These techniques are typically classified into real image and virtual image categories. Most real image methods involve direct viewing of a display surface or viewing of a screen upon which an image is projected. The object or subject being displayed is focused and appears to be located at the physical position of the surface or screen. Difficulties can arise if the display requirements include a large size or high brightness.

In many applications, it is required or desirable that the apparent distance to the subject be larger than is feasible with a real image source. In these cases, virtual image display techniques are used wherein the apparent distance from the observer to the viewed subject is greater than the optical path length from the observer to the display screen. Examples include head up displays, head or helmet mounted displays, and compact simulation displays. These displays include collimation optics to allow a small real image source to appear to be at or near optical infinity. For demanding applications, however, these methods become undesirable due to the size, weight, and complexity of the required optics. Factors include field of view, resolution, distortion, pupil size, and distance between the display and the viewer.

Retroreflective elements have been applied to enhance display performance or to achieve special effects. The use of real image projection screens with retroreflective properties to enhance brightness when viewed within the high gain cone angle is well known. Giordano, in U.S. Pat. No. 3,200,702, issued Aug. 17, 1965, appears to teach that a real image (high spatial resolution) retroreflecting screen can be used to keep two perspective views separate, thereby facilitating autostereoscopic real image projection. This approach is used by Breglia et al. in U.S. Pat. No. 4,348,185, issued Sep. 7, 1982.

Kassies in U.S. Pat. No. 4,509,837, issued Aug. 9, 1985, teaches that a retroreflective array can be used to project a real image of real object, complete with depth and perspective information. This real image is formed between the retroreflector array and the viewer. Although no physical screen is used, the image is considered real since it could be seen if a screen was placed at the focus region. Moss et al. in U.S. Pat. No. 5,035,474, issued Jul. 30, 1991, teach a dual collimator configuration, but not a retroreflective display system.

In the aforementioned examples involving retroreflective screens, the spatial resolution of the retroreflective array is essential to high resolution imaging performance. This places constraints on the achievable angular resolution due to diffractive effects. The presentation of real images for viewing also limits the compactness of such approaches.

In a related art, two basic collimation devices have been used for relaying virtual image display information to a viewer. These devices involve refractive (i.e., lens) optics and catadioptric or reflective (i.e., mirror) optics. Diffractive optics have been considered as well in analogous modes of the refractive and reflective configurations. Flat mirrors and beamsplitters often have been used in conjunction with the collimating device. Such combinations have exhibited disadvantages. For example, in the case of head up displays (HUD's), a large field of view (FOV) in a large head clearance distance necessitates a rather large collimator. Since the collimator must maintain its integrity as an optical element, its large size and a vibration modes, both within the optical element and relative to the rest of the projection system, are troublesome. The vibration modes are minimized at the expense of making the collimator rather thick and heavy thereby leading to further disadvantages and practical limitations.

In all high performance virtual display systems, especially the reflective systems, the optics tend to be complex when trying to compensate for the aberrations introduced by the large collimation elements. Such optics must be large to project the required intermediate image. Some related art discloses a retroreflecting screen that is a real image projection screen where the real image is focused onto the screen surface. One instance is the placement of this screen surface entirely on a "helmet" in a configuration very similar to that which has been regarded as a basic helmet mounted display. However, such display is not collimated and does not share the advantages of the present invention. The primary advantages provided by retroreflectors in this instance are screen gain (e.g., to improve brightness in simulators) and in the helmet display configuration, the separation of the viewability of each eye's image by the other eye.

SUMMARY OF THE INVENTION

The present invention is a virtual image projection device that has in lieu of a large collimating element, an array of small retroreflective elements which has a collimated image projected on to it by a projector via a beamsplitter. The collimated image is then retroreflected back onto an external exit pupil. The array is lightweight and insensitive to alignment.

The present invention eliminates many of the difficulties faced by the previously described methods. A virtual image of a display image source is provided by means of collimation optics and a retroreflective array virtual image projection screen. The use of a high angular precision retroreflective array or screen as a relay element makes possible compact, high performance virtual imaging with comparatively simple optics. The incorporation of this invention provides opportunities for reduced heads up display weight, reduced head or helmet mounted display weight, increased field of view, increased exit pupil size, increased head or helmet mounted display overlap, reduced support structure requirements, lower cost, simpler optics, elimination of vibration sensitivity, and easier alignment and maintainability.

DESCRIPTION OF THE PREFERRED EMBODIMENTS

Figure 1:
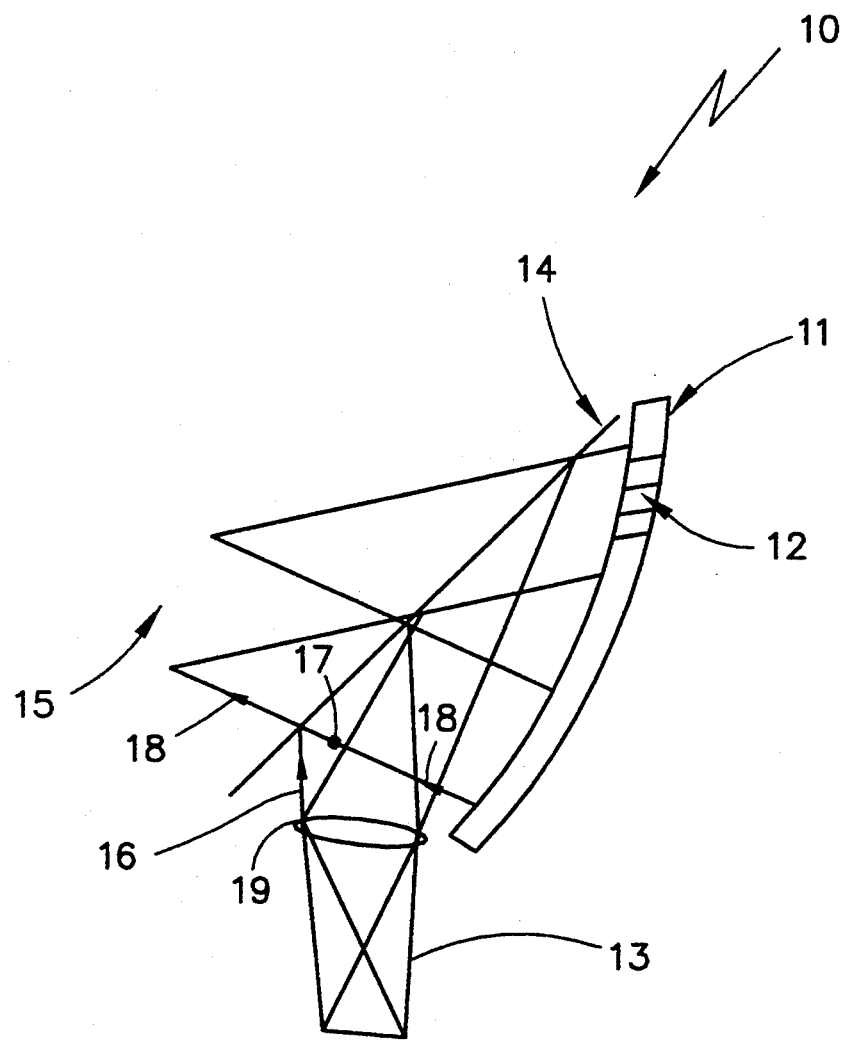
FIG. 1 reveals a basic embodiment of the invention.

FIG. 1 illustrates a basic retroreflective array virtual image projection screen system 10. Array 11 is made up of elements 12 which are lightweight and insensitive to alignment. These elements 12 are retroreflective in nature. Rather than forming an intermediate image in front of a collimator, as is usually done in the related art, a collimated or nearly collimated image 16 is projected by projector 13 onto beamsplitter 14 which reflects projected image 17 onto retroreflective array 11. Collimated image 17 is then retroreflected as image 18 through beamsplitter 14 onto an external exit pupil 15. Diverging rays from an image source are collimated by a projector 13 lens 19. The diverging ray bundles 16, one for each point on the image source, are reflected by beamsplitting mirror 14 onto the retroreflecting screen 11. A ray 18 reflected from a high angular precision retroreflector 11, such as a corner cube element 12, emerges parallel to incoming ray 17. Rays 18 reconverge onto beamsplitter 14, and a portion of rays 18 is transmitted through beamsplitter 14, forming an exit pupil 15 at a reflected position of the projector 13 lens. Beamsplitter 14 splits the light at 50 percent, for example, at the design wavelength. Placing one's eye at exit pupil 15 is analogous to placing the eye directly at a projection lens 19, except that image 16 is inverted. Projector 13 and its optics are situated away from retroreflective screen 11. Increasing the aperture of projection lens increases the exit pupil 15 size.

As with any virtual image projection display, care must be given to alignment and elimination of distortion between the real world and the projected image. Thus, the projector 13 optics must correctly reconstruct the image. Since no angular deviations are caused by retroreflector array 11, the latter introduces no additional distortions.

Various optical configurations are used in construction of retroreflector arrays 11. Two types used for present array 11 are corner cubes and cat's-eye elements 12. A corner cube 12 of FIG. 7a retroreflects with sequential reflection by three orthogonal flat mirrors 56, 57 and 58 (or sides of a prism, such as by total internal reflection). A cat's-eye retroreflector element 12 in FIG. 7b, has a mirror 62 (or diffuser) placed at the focal plane of lens 64. For a small angular field-of-view retroreflective virtual image system, a single cat's-eye retroreflector element 12 may be used.

Figure 7C:
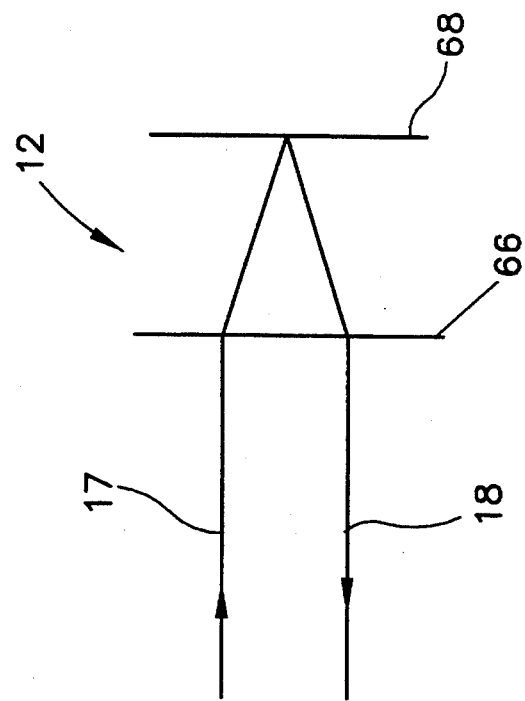
FIGS. 7a–c illustrate various retroreflector elements.
Figure 7B:
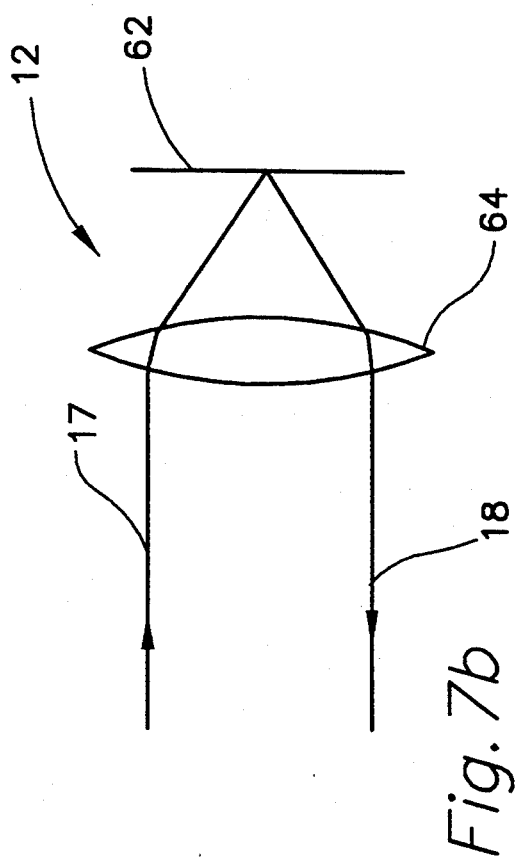
Figure 7A:
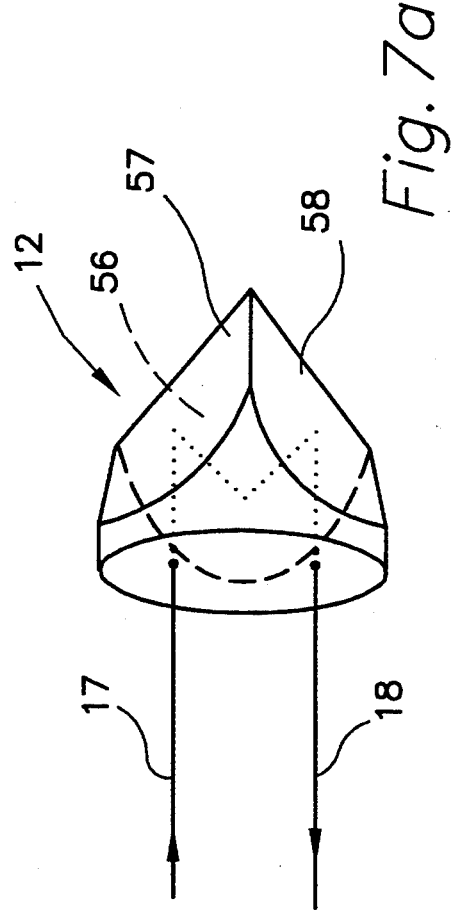

FIG. 7c shows a diffractive type retroreflective element 12. Light 17 passes through diffractive element 66 and is reflected by mirror 68.

Figure 8:
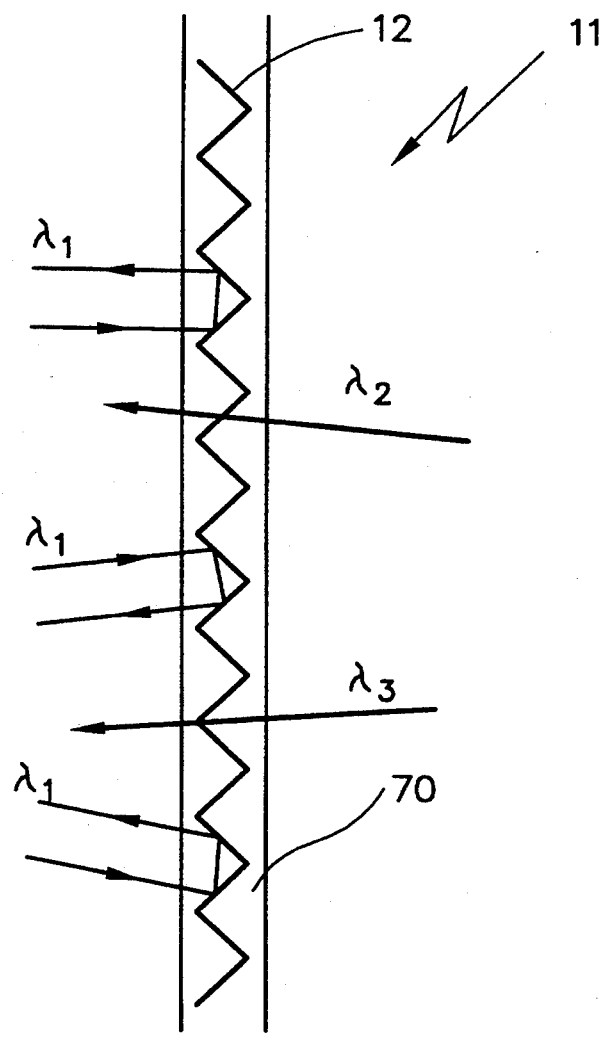
FIG. 8 is a cross-section of one possible retroreflective array configuration.

Retroreflective array 11 may consist of discrete corner-cube elements 12 optically immersed in substrate 70, for a see-through configuration, as shown in FIG. 8. Each of the corner cubes, for example, are a few millimeters across and are placed side by side in a two dimensional (hexagonal) array and bonded to substrate 70. The reflecting surfaces, 56, 57 and 58, of cubes 12 (in FIG. 7a) are coated with either a holographic or multilayer dielectric mirror film which selectively reflects the display wavelength lambda$_1$, over the design angle (a nominally 45-degree incidence on the reflecting surface). The back side of array 11, of FIG. 8, is filled with an index matching material yielding a highly efficient retrorefector having excellent see-through characteristics at wavelengths lambda$_2$ and lambda$_3$, and having low haze.

Figure 2:
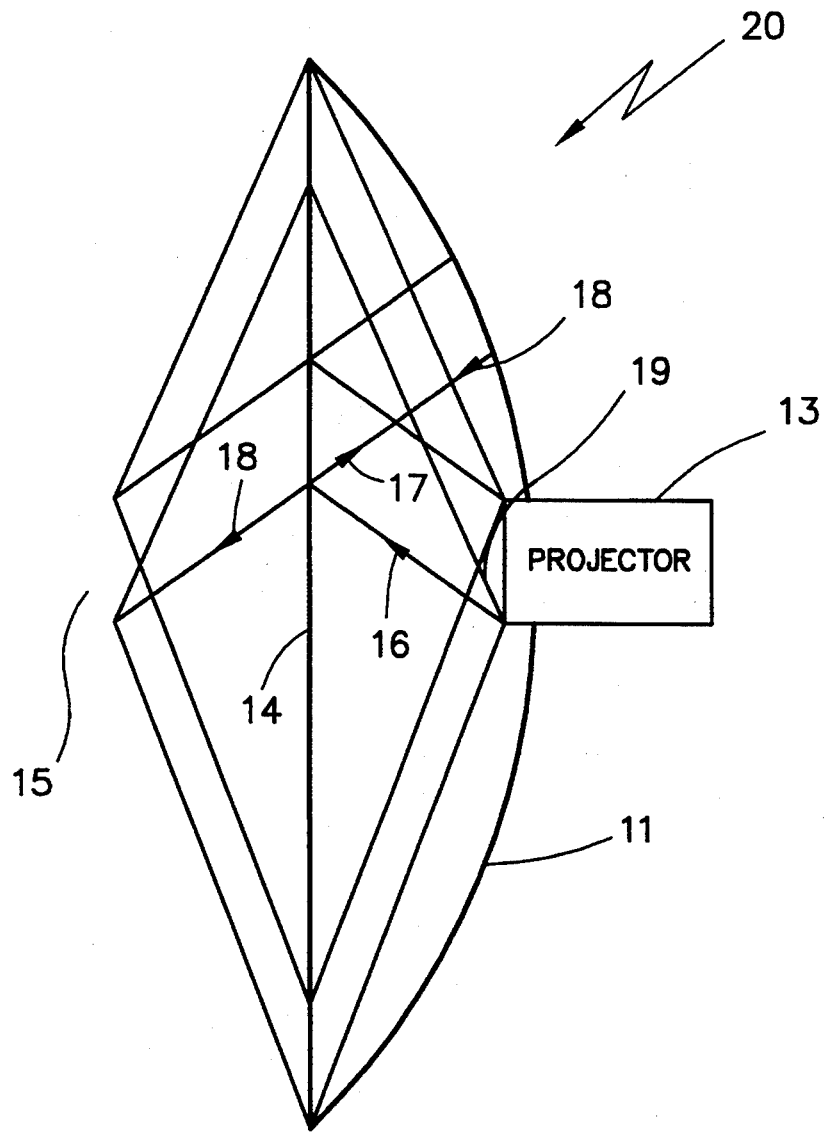
FIG. 2 is a configuration having a large field of view.

FIG. 2 shows virtual image projection system 20 having projector 13 situated in the center of array 11. Projector 13 and its associated optics 19 provide a wide angle collimated output. The principles of operation of system 20 are like those of system 10. System 20 has the feature of providing a large field of view. In principle, the field of view can approach 2 pi steradians of solid angle (180 degrees×180 degrees), although having the exceptions of practical limitations on beamsplitter 14 and retroreflective array 11 size, and the obscuration of retroreflector 11 by projection lens 19 of projector 13. The latter noted obscuration occurs because projector 13 and its optics 19 are situated at the center of retroreflected array 11.

Figure 3:
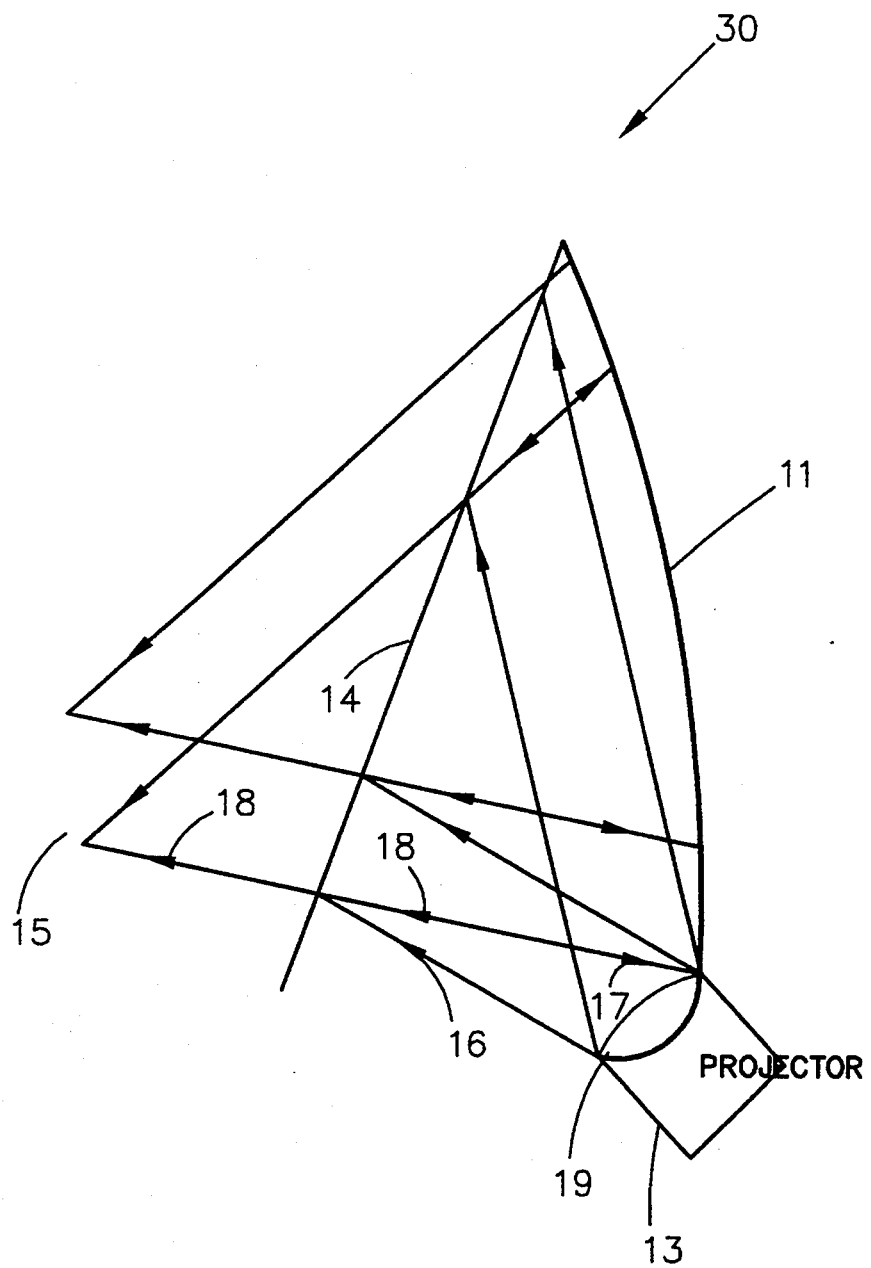
FIG. 3 is a configuration that places the blind spot created by the projection lens into a region of least critical viewability.

For a small and moderate field of view, only one side of the system might be used as suggested by configuration 30 in FIG. 3. When a larger field of view is needed, the blind spot created by lens 19 is situated in a region of a view least critical for the viewer, such as a region away from the center of array 11. The exact positioning of the various components depends upon a number of parameters such as the desired field of view (FOV), projector 13 mounting mechanism, retroreflecting screen 11 shape, clearance considerations, and the desired unobstructed visual field of view. To keep the forward line of sight unobstructed, the display 11 axis is rotated such that projector 13 is above, below or to the side. If the field of view, for one axis, is less than 60 degrees or so, the arrangement can be located to just one side of the projector 13 lens. FIG. 3 is a side view of system 30. Configuration 30 also functions like system 10 of FIG. 1.

Figure 4A:
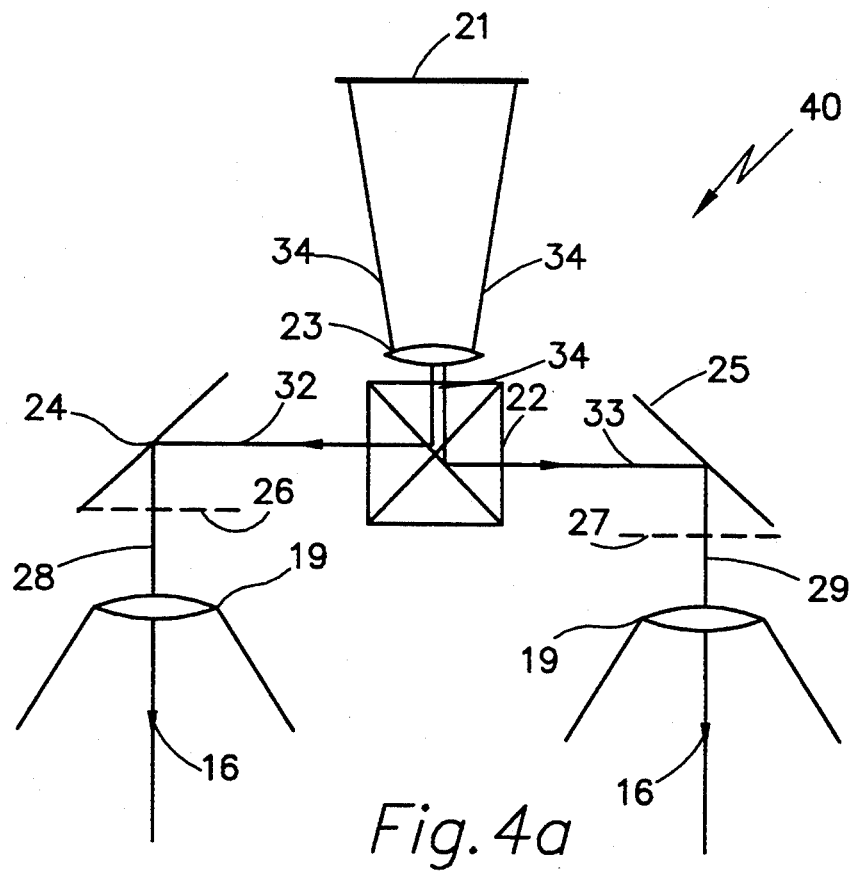
FIGS. 4a, 4b and 4c show dual collimator configurations.
Figure 4B:
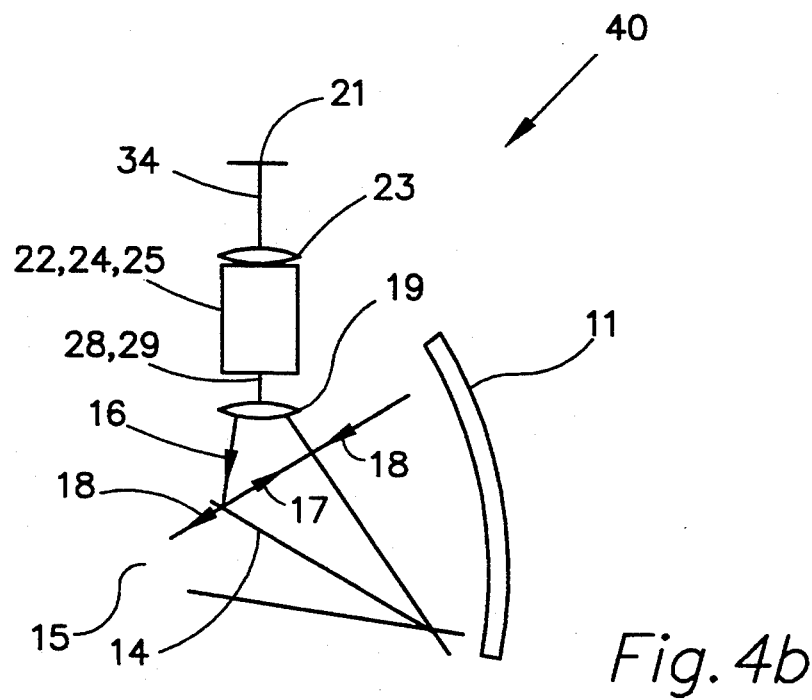
Figure 4C:
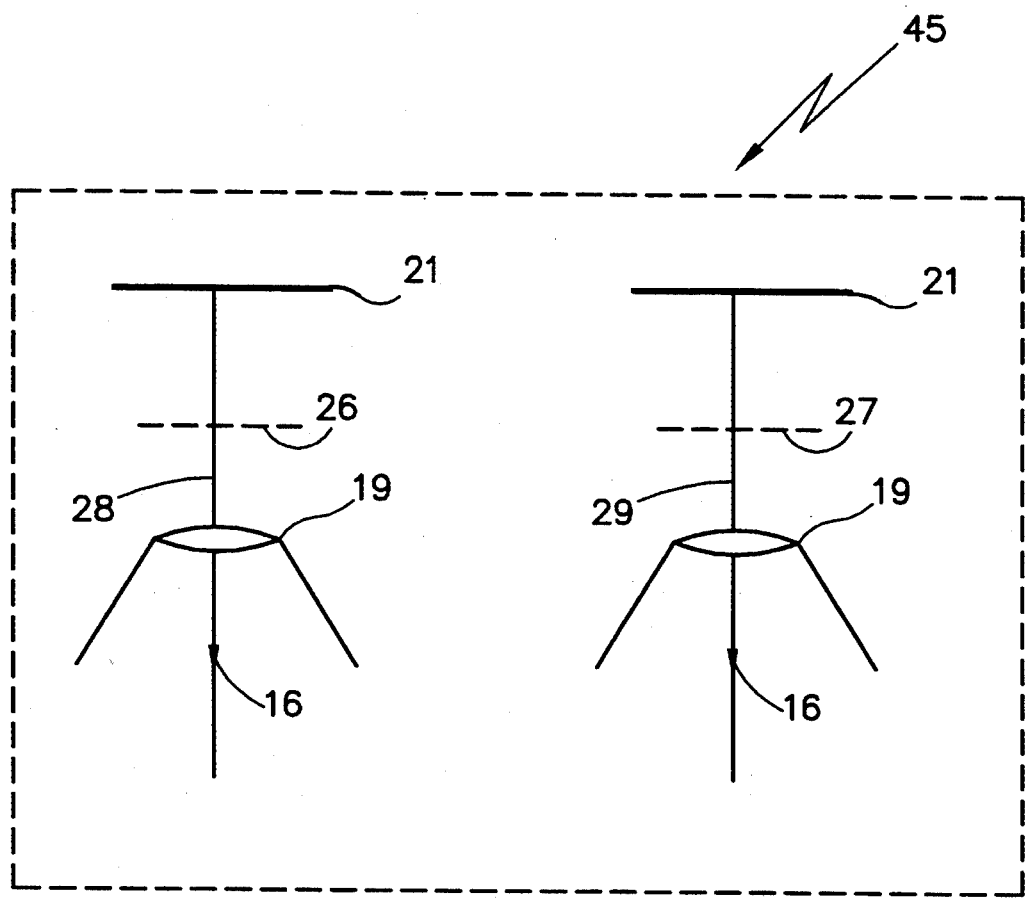

A layout for a heads up or helmet mounted display application is system 40 of FIG. 4. With a suitable retroreflective visor 11 and a high resolution image source 21, system 40 can provide in the range of, or more than, 100 degree horizontal by 50 degree vertical biocular field of view, with a 100 percent overlap and a single image source 21. FIG. 4a shows a front view of system 40. Light 34 comes from high resolution image source 21, goes through relay lens 23 on into x-prism beamsplitter 22. Light ray 32 exits out of prism beamsplitter 22 onto fold mirror 24 and light 28 is reflected by mirror 24 on through intermediate image diffuser, which is optional, on through projector lens 19 and exiting lens 19 as light 16 which goes on to beamsplitter 14 as shown in FIG. 4b. Light 34 from relay lens 23 is reflected by x-prism beamsplitter 22 in another direction as beam 33 in opposite direction of beam 32. Beam 33 impinges fold mirror 25 and is reflected as beam 29 on through optional intermediate image diffuser 27. Beam 29 goes through projector or collimator lens 19 and exits lens 19 as beam 16 to impinge beamsplitter 14 in FIG. 4b. Light beams 16 are reflected off of beamsplitter 14 as light 17 which hits retroreflector 12 and is reflected back on through beamsplitter 14 to exit pupil 15. FIG. 4c shows a dual collimator system 45 having two image sources 21, wherein relay lens 23, prism beamsplitter 22, and fold mirrors 24 and 25 can be eliminated. System 45 is designed to have biocular or binocular capability.

Figure 5A:
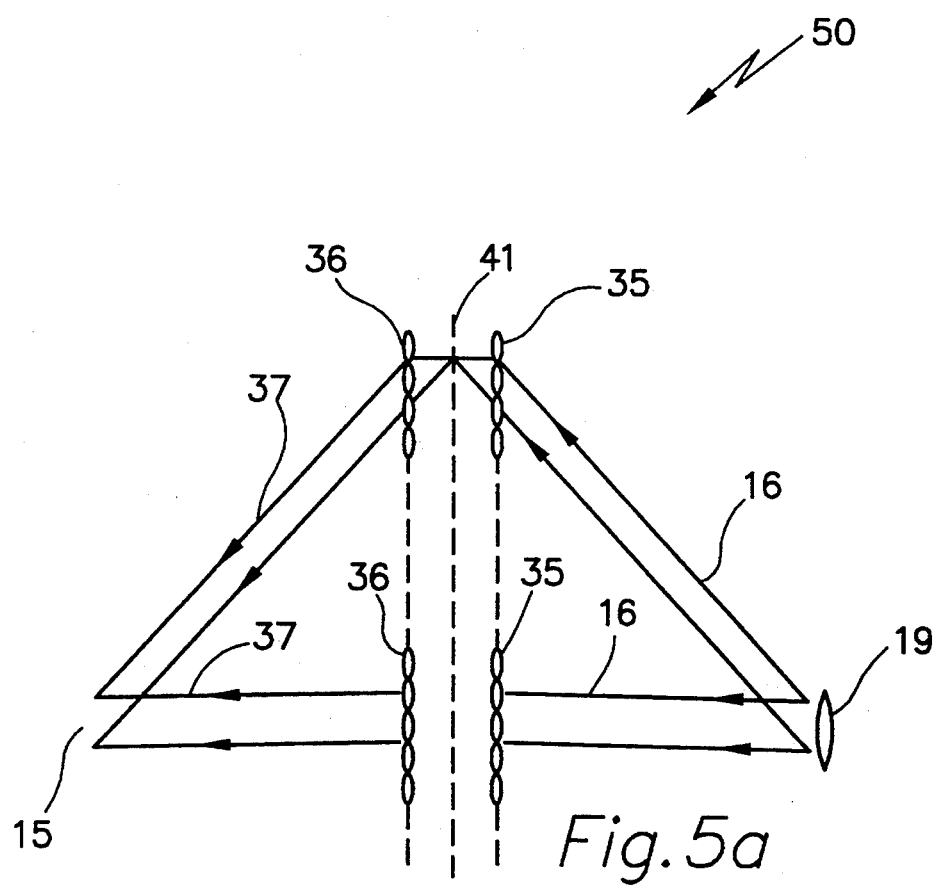
FIGS. 5a and 5b show a transmissive variation of the invention as a reconverging collimator element for rear projection, and a transmissive variation combined with the reflective version, to fill in a portion of the missing image where the projector is situated.

A transmissive variation 50 is shown in shown FIG. 5a. System 50 may be used in itself as a redirecting collimated relay element for rear projection. Beam 16 exits projector lens 19 and goes through imaging lens 35. The light is redirected and possibly diffused by screen 41 which is, for example, a diffractive or scattering element. Then the light goes through recollimating lens 36 and is refracted on as light 37 to exit pupil 15. The combination of imaging lens 35 and recollimating lens 36 constitutes what can be referred to as "unfolded cat's eye" retroreflector.

Figure 5B:
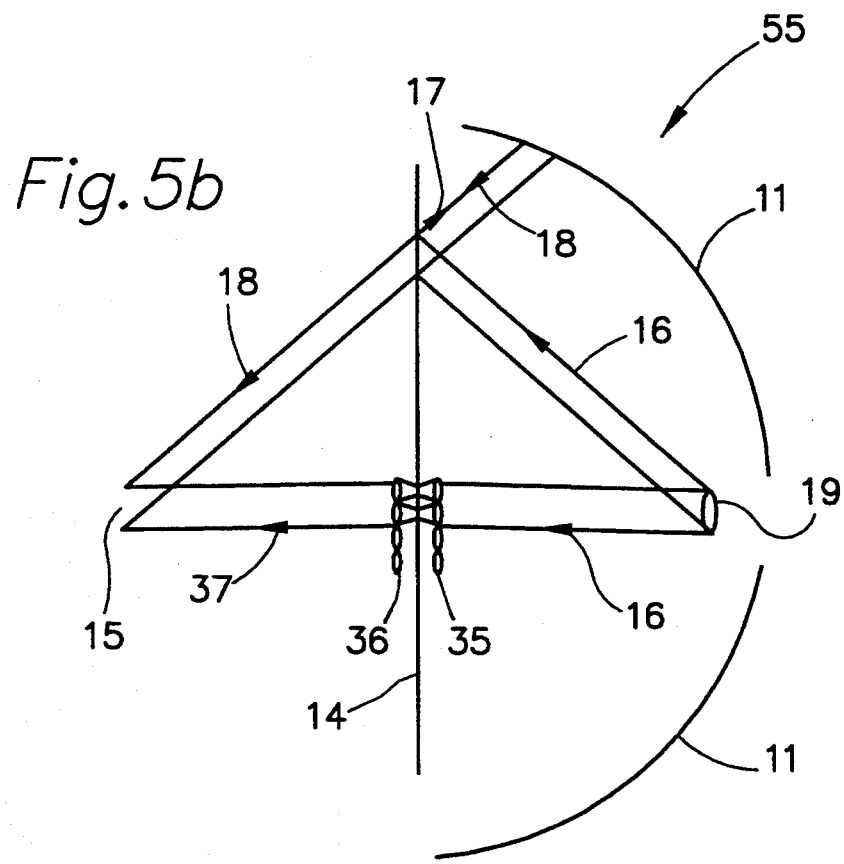

A system 55 in FIG. 5b is system 50 combined with the reflective version of system 20 in FIG. 2. System 55 utilizes the unfolded cat's eye, as shown in system 50, to fill in the portion of the missing image or to recover the blind spot where projector lens 19 is situated on retroreflector 11. Some of light 16 impinges beamsplitter 14, and is reflected as light 17 which impinges retroreflector 11 and is reflected again as light 18 which goes through beamsplitter 14 onto exit pupil 15. Light 16 leaves lens 19 in a direction more towards the center of beamsplitter 14 which is effectively a blind spot on retroreflector 11 because of lens 19. Such light 16 goes through imaging lens 35 and then on through recollimating lens 36. Light exits recollimating lens 36 as light 37 and goes on to exit pupil 15.

Figure 6:
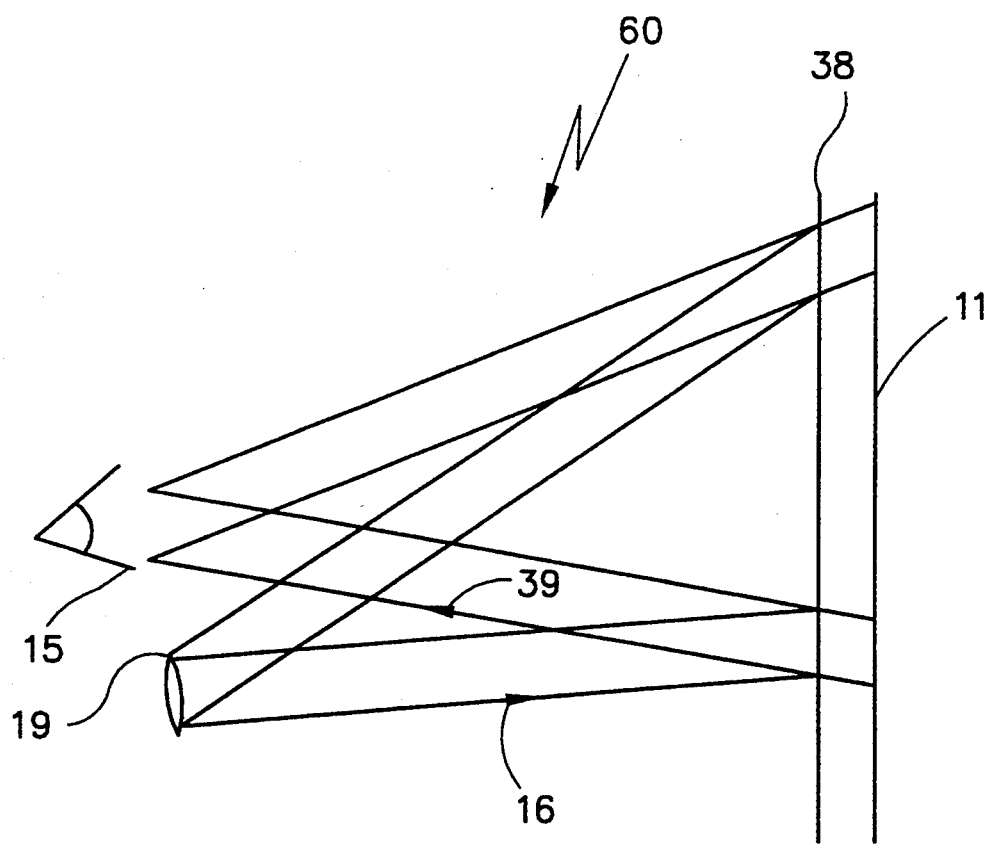
FIG. 6 is a retroreflective array projection system having a diffractive beamsplitter.

System 60 utilizes a diffractive beamsplitter 38 as shown in FIG. 6. Beamsplitter 38 may be part of the screen or retroreflector array 11, rather than being situated in the middle between array 11 and exit pupil 15. To optimize system 60, proper curvature and/or cylindrical correction would have to be added to diffractive beamsplitter 38 and retroreflector array 11. Diffractive beamsplitter 38 may be an amplitude or phase grating. Beam 16 comes through projector lens 19 on through diffractive beamsplitter 38, impinges retroreflector array 11 and is reflected back on through beamsplitter 38 as light 39 which goes to exit pupil 15.

The largest element, retroreflector array 11, does not need to be highly stable. Only the angle of reflective light 38 is critical in a collimated image, and with retroreflectors 12, this angle is unaffected by vibration, translation or moderate rotation. Thus, the image and exit pupil 15 are defined by the positions and angles of only projector 13 and beamsplitter 14.

Since relay optics, such as 19 and/or 23, need only to collimate the image, these optics may be simple, small and lightweight. Exit pupil 15 of the entire system is roughly the size of the projector 13 aperture 19, and thus can be tailored as desired by altering the effective F/number of lens 19. For instance, a simple low F/number wide angle camera lens, set to a range of infinity, can serve as an excellent optical system for use with beamsplitter 14 and array 11 for a head or helmet mounted display.

Retroreflective array 11 may comprise corner cube elements 12, cat's eye retroreflectors 12 or other retroreflective elements. For retroreflective array 11, reflective sheeting from 3M and REFLEXITE were used, as well as a corner cube array manufactured as an automobile or bicycle safety reflector. This reflector 12 implementation was successfully utilized in system 10 of FIG. 1. A 35 mm slide and a large aperture projection lens 19 were used as projector 13. Basic performance of system 10 was successful. Improved resolution was achieved by the use of corner cubes with improved angular precision.

Retroreflector array 11 is compatible with monochrome or color displays. If using corner cubes as elements 12 in retroreflector array 11, array 11 will not exhibit chromatic aberrations. Cube corners as elements 12 may be hollow or filled as prisms.

Cube corners as elements 12 can be due to total internal reflection, mirror coatings, wavelength-selective mirror coatings, holographic coatings, and so forth. Corner cubes as elements 12 can be modified to produce exit beams 18 angularly offset from incident beam 17. This can be done, for instance, by changing the angle of one of the planes forming the corner. This may be a possible option for eliminating beamsplitter 14 and thus letting the incident beam be beam 16. Fixed angular offset can also be achieved with a cat's eye retroreflector design by recollimating the image through adjacent lens elements.

Retroreflector array 11 may be produced by various methods, such as replication of a master, and be produced at rather low cost. Precision of array 11 required for system 10, 20, 30, 40, 55 or 60, requires substantially less precision than that required for many laser applications. Flexible retroreflector arrays 11 may be made, for example, by supporting rigid corner cubes 12 with a flexible linkage. Peripheral regions, such as on helmet mounted displays, could use light weight retroreflective sheeting such as is available from 3M or REFLEXITE, with higher angular resolution retroreflective sheeting only in the foveal viewing region. However, resolution of the lightweight retroreflective sheeting might be too low for foveal viewing. In fact, retroreflector array 11 could be used for peripheral images only in conjunction with a refractive or reflective ocular.

Individual retroreflectors 12 may be rotated or otherwise individually adjusted to maximize the acceptance angle and area of array 11. See-through may be achieved in array 11, such as in the case of corner cube array, by embedding the corner cube mirrors inside of a low distortion element such as a flat plate or visor. This was depicted in FIG. 8. Transmission would be unperturbed but reflection in the selected wavelength region (assuming selective coatings) would be retroreflective in nature. Of course, see-through through could be provided by switching relative positions of the viewer and projection lens 19 to system 10 and FIG. 1, such that the forward outside scene would not be viewed through the retroreflectors 12.

Cat's-eye retroreflectors of systems 50 and 55 and FIGS. 5a and 5b, respectively, can be of a refractive or diffractive nature. The mirror behind each lens element can be flat, curved, diffractive, diffuse, or retroreflective, depending on the specific detailed optical design. The diffuse characteristic tends to minimize gaps and the retroreflective characteristic minimizes aberrations, if necessary, perhaps at lower resolution. The screen may be vibrated or otherwise moved to eliminate residual grid patterns due to the finite retroreflector elements 12.

A hybrid system may be used where one axis uses the retroreflector approach (a simple +/− 45 degree blazed grating reflector, for instance) and the other axis uses the traditional catadioptric or refractive approach.

The same retroreflector and/or beamsplitter can be shared by both oculars on a helmet mounted display. This sharing gets around the maximum biocular or binocular overlap constraints obtained with other helmet mounted display designs. Head or helmet mounted display interpupillary distance (IPD) can be adjusted by moving compact projectors 13. This circumvents one of the more difficult problems with using a visor display method. Monocular, biocular, binocular, stereoscopic, autostereoscopic, and large head box systems may be designed. Head tracking and relative motion of projector 13 can increase the head box. The use of additional beamsplitters 14 (in many places in the system) can increase the exit pupil 15 size. Curved and holographic beamsplitters 14 may be used, although relay optics would become more complex if the same resolution was to be maintained. Also, polarization schemes may be implemented in the systems to boost efficiency.

I claim:

1. A transmissive/retroreflective, virtual image display system comprising:
   a real image projector;
   a collimating lens attached to said projector;
   a beamsplitter proximate to said collimating lens; and
   a virtual image, retroreflecting display screen proximate to said beamsplitter, wherein said display screen comprises a substrate having transmissive characteristics at a first range of wavelengths, and retroreflective elements adjacent to one another in said substrate, the retroreflective elements having retroreflective characteristics at a second range of wavelength.

2. A transmissive/retroreflective array virtual image projector screen system comprising:
   projection means for emanating light rays of real images;
   collimating means for collimating the light rays;
   beamsplitting means for reflecting light rays from said collimating means; and
   transmissive/retroreflective means for receiving the light rays reflected by said beamsplitting means and reflecting the light rays of a first group of wavelengths as virtual images through said beamsplitting means onto an exit pupil location, for viewing by an observer, and transmitting the light waves of a second group of wavelengths.

3. The projection screen system of claim 2 wherein said projection means is situated apart from said transmissive/retroreflective means.

4. The projection screen system of claim 3 wherein said projection means is situated at a perimeter of said transmissive/retroreflective means.

5. The projection screen system of claim 2 wherein said transmissive/retroreflective means comprises:
   a transmissive substrate; and
   retroreflective elements situated adjacent to one another in said substrate.

6. The projection screen system of claim 5 wherein said retroreflective elements are corner cubes, each cube having three orthogonal reflecting surfaces for providing sequential reflection of a received light ray, of the first group of wavelengths.

7. The projection screen system of claim 5 wherein said retroreflective elements are cat's eye elements, each element having a lens and a reflecting mirror at a focal plane of the lens.

8. The projection screen system of claim 5 wherein said retroreflective elements are diffractive, each element having a diffracting device and a mirror such that a light ray received through the diffracting device is reflected by the mirror back through the diffracting device.

9. A transmissive/retroreflective, virtual image projection screen system, comprising:
   a source of a real image having light rays;
   a collimating lens situated in a path of the light rays;
   a partially reflecting beamsplitter situated in a path of collimated light rays;
   a partially retroreflecting array situated in a path of reflected or transmitted collimated light rays; and
   an exit pupil situated in a path of retroreflected light rays of a first group of wavelengths of a virtual image.

10. A transmissive/retroreflective, virtual image projection screen system comprising:
    a source of light rays of a real image;
    a collimating device situated in a path of the light rays;
    a partially retroreflecting array situated in a path of collimated light rays; and
    an exit pupil situated in a path of retroreflected, collimated light rays of a first group of wavelengths of a virtual image.

11. A retroreflective, virtual image projection screen system comprising:
    a retroreflecting screen;
    an image source, having a wide angle collimated output, situated approximately at a center location on said retroreflecting screen; and
    a beamsplitter situated across said retroreflecting screen.

12. The system of claim 11 wherein:
    said image source emanates collimated light of a real image onto said beamsplitter;
    said beamsplitter reflects some of the collimated light of the real image onto said retroreflecting screen; and
    said retroreflecting screen reflects the collimated light of a virtual image through said beamsplitter onto an exit pupil location for viewing by an observer.

13. A wide-angle, retroreflective, virtual image projection screen system comprising:
    a source of light rays of an image;
    a first beamsplitter situated in a first path of the light rays;
    a first mirror situated in a second path of light rays from said beamsplitter;
    a second mirror situated in a third path of light rays from said beamsplitter;
    a first collimator situated in a fourth path of light rays from said first mirror;
    a second collimator situated in a fifth path of light rays from said second mirror;
    a second beamsplitter situated in the fourth and fifth paths of light rays from said first and second collimators, respectively; and
    a retroreflective screen situated in sixth and seventh paths of light rays from said second beamsplitter.

14. The system of claim 13 wherein:
    said first beamsplitter is an x-cube prism for splitting the first path of light rays into the second and third paths of light rays, the light rays of the second and third paths directed in opposite directions;

said first and second mirrors reflect the light rays of the second and third paths along the fourth and fifth paths, respectively, the fourth and fifth paths being approximately parallel to each other and in directions toward the first and second collimators, respectively, and toward said second beamsplitter;

said second beamsplitter reflects light rays from the first and second collimators situated in the fourth and fifth paths of light rays, respectively, into the sixth and seventh paths onto said retroreflective screen; and said retroreflective screen reflects the light rays from the sixth and seventh paths along an eighth path through said second beamsplitter and onto an exit pupil for wide-angle viewing of the image by an observer.

15. A virtual image projection system comprising:
a source of an image having collimated light rays in a first path; and
a retroreflective array of cat's eye retroreflective elements, wherein each retroreflective element comprises:
an imaging lens situated in the first path of the light rays, for focusing the light rays;
a reflector, proximate to said imaging lens, for reflecting light rays from said imaging lens; and
a re-collimating lens, proximate to said reflector, for recollimating the light rays from said reflector into a second path of light rays, angularly deviated from said first path of light rays, that go onto a location of an exit pupil for viewing of the image by an observer.

16. A retroreflective, virtual image projection system comprising:
a first retroreflective array having a source of an image situated approximately at a center of said retroreflective array, having light rays in first and second paths;
a second retroreflective array of unfolded cat's eye elements, situated in the first path, wherein each element comprises:
an imaging lens situated in the first path;
a deflecting element proximate to said imaging lens; and
a recollimating lens situated proximate to said deflecting element; and
a beamsplitter situated in the second path of light rays; and
wherein:
said first retroreflective array is situated in a third path of light rays reflected from said beamsplitter, and retroreflects the light rays of the third path of light rays along a fourth path through said beamsplitter onto an exit pupil for viewing a first portion of the image by an observer;
a fifth path of light rays goes from said second retroreflective array onto the exit pupil for viewing a second portion of the image by the observer; and
the second portion of the image in a blind spot of said first retroreflector wherein said source of the image is situated.

17. A retroreflective, virtual image projection system comprising:
a source of an image having collimated light rays in a first path;
a retroreflective array; and a diffractive beamsplitter, in a transmissive mode, situated between said source and said array situated in the first path of light rays; and
wherein:
diffracted light rays in a second path from said beamsplitter are retroreflected by said array in a third path through said beamsplitter onto an exit pupil for viewing of the image by an observer; and
the image at the exit pupil is a virtual image.

18. A retroreflective, virtual image projection system comprising:
a first image source for emanating light rays in a first path;
a first collimating lens situated in the first path; a second image source for emanating light rays in a second path;
a second collimating lens situated in the second path;
a beamsplitter situated in a third path of light rays from said first collimating lens and situated in a fourth path of light rays from said second collimating lens; and
a retroreflecting screen situated in fifth and sixth paths of light rays from said beamsplitter.

19. The system of claim 18 wherein:
said retroreflecting screen has high angular resolution in the foveal view regions, and lower resolution in the periphery.

20. A retroreflective array virtual image projector screen system comprising:
projection means for emanating light rays of real images;
collimating means for collimating the light rays;
beamsplitting means for reflecting light rays from said collimating means; and
retroreflective means for receiving the light rays reflected by said beamsplitting means and reflecting the light rays as virtual images through said beamsplitting means onto an exit pupil location, for viewing by an observer, comprising diffractive retroreflecting elements, each element having a diffractive element and a mirror such that a light ray received through the device is reflected by the mirror back through the diffractive element.

21. A retroreflective array virtual image projector screen system comprising:
projection means for emanating light rays of real images;
collimating means for collimating the light rays;
beamsplitting means for reflecting light rays from said collimating means; and
retroreflective means for receiving the light rays transmitted by said beamsplitting means and reflecting the light rays as virtual images reflected from said beamsplitting means onto an exit pupil location, for viewing by an observer, comprising diffractive retroreflecting elements, each element having a diffractive element and a mirror such that a light ray received through the device is reflected by the mirror back through the diffractive element.

22. A retroreflective, virtual image projection system comprising:
a source for emitting light;
an exit pupil; and
a retroreflective array of unfolded cat's eye elements between said source and said exit pupil, wherein each cat's eye element comprises:
a first lens for focusing light from said source;

a deflecting element proximate to said first lens; and a second lens for recollimating light from said deflecting element.

23. A transmissive/retroreflective, virtual image projection screen system, comprising:

a source of a real image having light rays;

a collimating lens situated in a path of the light rays;

a partially transmitting beamsplitter situated in a path of collimated light rays;

a partially retroreflecting array situated in a path of reflected or transmitted collimated light rays; and an exit pupil situated in a path of retroreflected light rays of a first group of wavelengths of a virtual image.

24. A virtual image projection system comprising:

a source of an image having collimated light rays in a first path; and a retroreflective array of cat's eye retroreflective elements, wherein each retroreflective element comprises:

an imaging lens situated in the first path of the light rays, for focusing the light rays;

a deflector, proximate to said imaging lens, for deflecting light rays from said imaging lens; and a re-collimating lens, proximate to said deflector, for recollimating the light rays from said deflector into a second path of light rays, angularly deviated from said first path of light rays, that go onto a location of an exit pupil for viewing of the image by an observer.

25. A retroreflective, virtual image projection system comprising:

a first retroreflective array having a source of an image situated approximately at a center of said retroreflective array, having light rays in first and second paths;

a second retroreflective array of unfolded cat's eye elements, situated in the first path, wherein each element comprises:

an imaging lens situated in the first path;

a diffuse element proximate to said imaging lens; and a recollimating lens situated proximate to said diffuse element; and a beamsplitter situated in the second path of light rays; and wherein:

said first retroreflective array is situated in a third path of light rays reflected from said beamsplitter, and retroreflects the light rays of the third path of light rays along a fourth path through said beamsplitter onto an exit pupil for viewing a first portion of the image by an observer;

a fifth path of light rays goes from said second retroreflective array onto the exit pupil for viewing a second portion of the image by the observer; and the second portion of the image in a blind spot of said first retroreflector wherein said source of the image is situated.

26. A retroreflective, virtual image projection system comprising:

a source for emitting light;

an exit pupil; and a retroreflective array of unfolded cat's eye elements between said source and said exit pupil, wherein each cat's eye element comprises:

a first lens for focusing light from said source;

a diffuse element proximate to said first lens; and a second lens for recollimating light from said diffuse element.

* * * * *